(12) United States Patent
Kindo et al.

(10) Patent No.: US 9,008,887 B2
(45) Date of Patent: Apr. 14, 2015

(54) DRIVING ASSIST DEVICE

(71) Applicants: Toshiki Kindo, Yokohama (JP);
Hiromitsu Urano, Susono (JP)

(72) Inventors: Toshiki Kindo, Yokohama (JP);
Hiromitsu Urano, Susono (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 0 days.

(21) Appl. No.: 14/025,264

(22) Filed: Sep. 12, 2013

(65) Prior Publication Data

US 2014/0018993 A1 Jan. 16, 2014

Related U.S. Application Data

(62) Division of application No. 13/257,191, filed as application No. PCT/IB2010/001095 on May 12, 2010, now Pat. No. 8,565,997.

(30) Foreign Application Priority Data

May 13, 2009 (JP) .................................. 2009-116613

(51) Int. Cl.
*G05D 1/00* (2006.01)
*B60W 30/14* (2006.01)
*B60W 30/12* (2006.01)

(52) U.S. Cl.
CPC ........... *G05D 1/0061* (2013.01); *B60W 30/143* (2013.01); *B60W 30/12* (2013.01)

(58) Field of Classification Search
USPC ........... 701/11, 15, 16–18, 23–28, 41–44, 48, 701/93, 96, 97, 98
See application file for complete search history.

(56) References Cited

U.S. PATENT DOCUMENTS

| 6,332,108 | B1 | 12/2001 | Hirasago |
| 2005/0010352 | A1* | 1/2005 | Michi et al. ...................... 701/96 |
| 2006/0030987 | A1 | 2/2006 | Akita |
| 2006/0095194 | A1* | 5/2006 | Arai et al. ........................ 701/96 |
| 2006/0237249 | A1 | 10/2006 | Steen et al. |
| 2006/0287800 | A1 | 12/2006 | Watanabe et al. |
| 2007/0272464 | A1 | 11/2007 | Takae et al. |
| 2007/0276577 | A1 | 11/2007 | Kuge et al. |

FOREIGN PATENT DOCUMENTS

| DE | 101 45 915 | 4/2003 |
| DE | 103 20 722 | 11/2004 |

(Continued)

OTHER PUBLICATIONS

International Search Report issued Nov. 2, 1010 in PCT/IB10/001095 filed May 12, 2010.

(Continued)

*Primary Examiner* — Khoi Tran
*Assistant Examiner* — Adam Mott
(74) *Attorney, Agent, or Firm* — Oblon, McClelland, Maier & Neustadt, L.L.P.

(57) ABSTRACT

A driving assist device includes a first control portion that controls a vehicle to carry out automated driving, and a second control portion that controls the vehicle to make a shift to manual driving, in which the vehicle travels on a basis of an driving operation by a driver, when canceling the automated driving, and changes a manner of canceling the automated driving in accordance with an elapsed time from a start of the automated driving.

6 Claims, 3 Drawing Sheets

(56) References Cited

FOREIGN PATENT DOCUMENTS

| | | |
|---|---|---|
| EP | 1 065 088 | 1/2001 |
| FR | 2 865 691 | 8/2005 |
| FR | 2 930 750 | 11/2009 |
| JP | 2003-034205 | 2/2003 |
| JP | 2004-299427 | 10/2004 |
| JP | 2005-250564 | 9/2005 |
| JP | 2006-101648 | 4/2006 |
| JP | 2006-321354 | 11/2006 |
| JP | 2007-196809 | 8/2007 |

OTHER PUBLICATIONS

Office Action issued Jan. 13, 2011 in Japanese Patent Application No. 2009-116613 filed May 13, 2009 (with partial English translation).

* cited by examiner

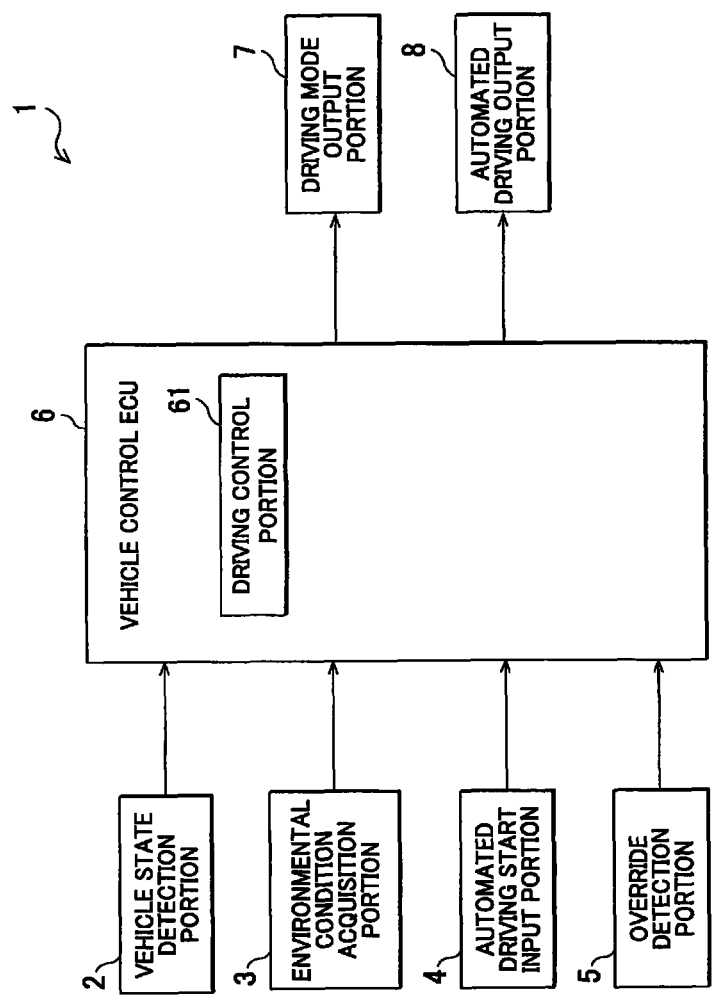

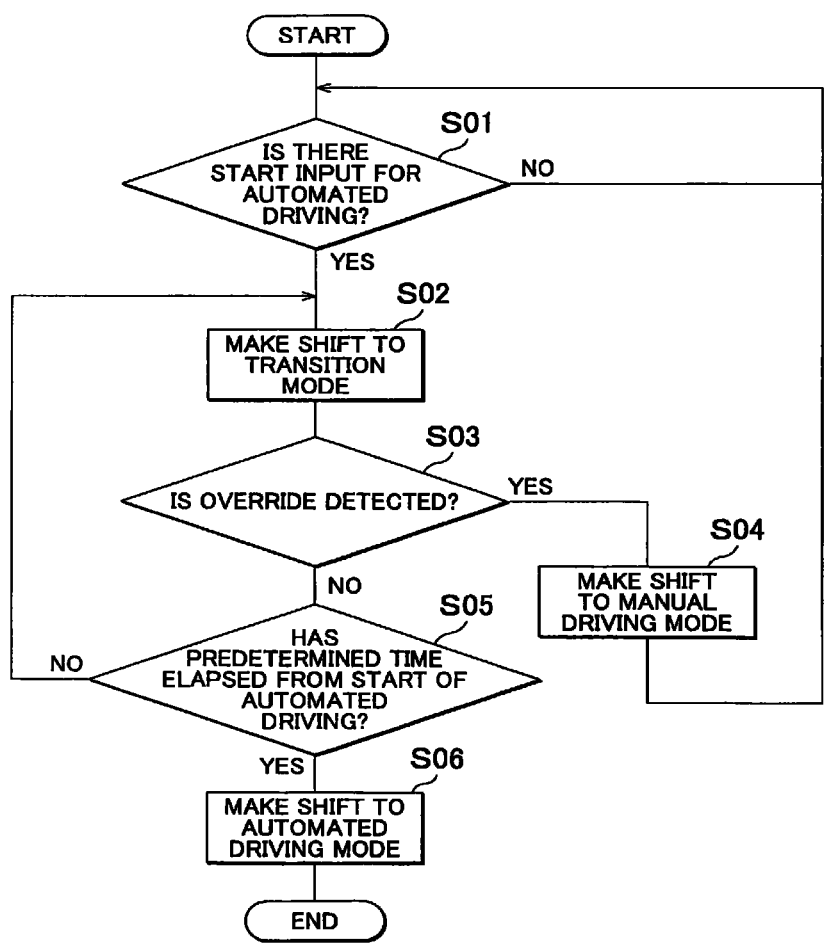

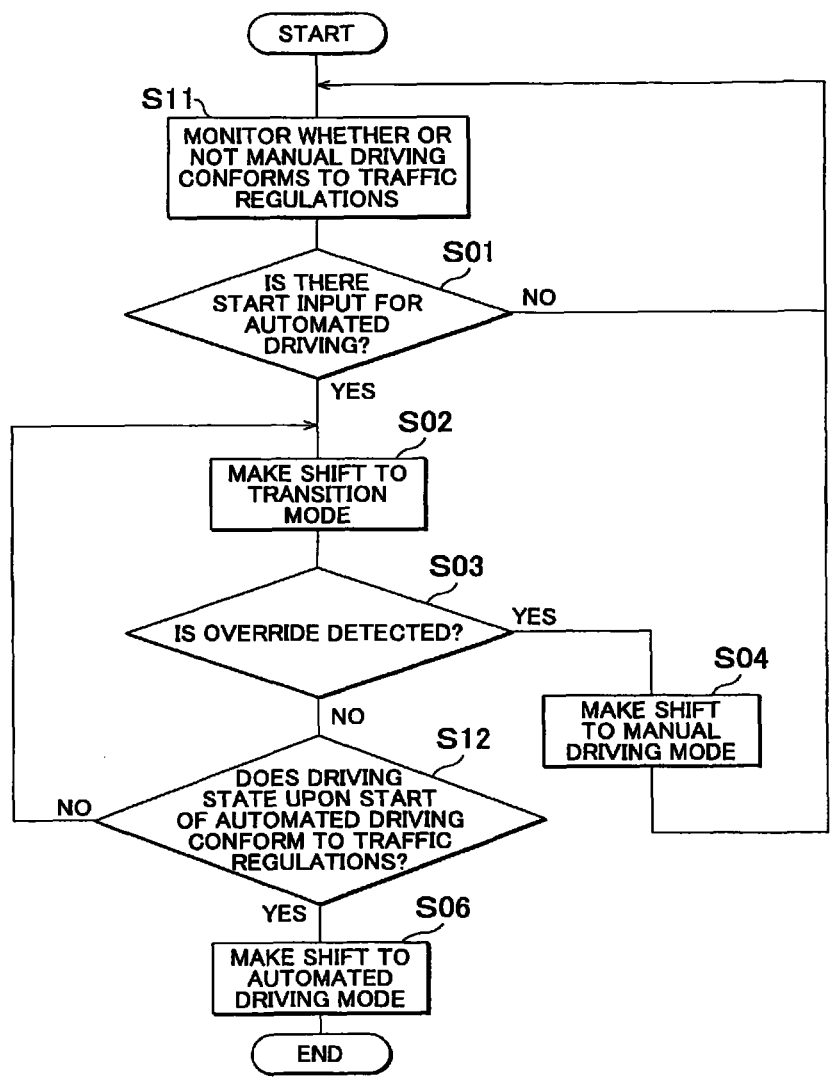

DRIVING ASSIST DEVICE

CROSS-REFERENCE TO RELATED APPLICATIONS

This application is a division of U.S. application Ser. No. 13/257,191 filed Sep. 16, 2011, the entire contents of which is incorporated herein by reference. U.S. application Ser. No. 13/257,191 is a National Stage of PCT/IB2010/001095 filed May 12, 2010, which is based upon and claims the benefit of priority from prior Japanese Patent Application No. 2009-116613 filed May 13, 2009.

BACKGROUND OF THE INVENTION

1. Field of the Invention

The invention relates to a driving assist device for assisting the driving of a vehicle by a driver.

2. Description of the Related Art

A certain type of driving assist device for assisting the driving of a vehicle by a driver controls the vehicle to carry out automated driving while maintaining a prescribed vehicle speed in response to a switch operation during manual driving in which the vehicle travels on the basis of a driving operation by the driver. The prescribed vehicle speed may be set to, for example, a vehicle speed at the time of the switch operation.

In such a driving assist device, when a changeover from automated driving to manual driving is made, it is desirable that the driving be taken over by the driver after it has been confirmed that the driver is ready to drive manually. Thus, in an automated driving control device described in Japanese Patent Application Publication No. 2007-196809 (JP-A-2007-196809), automated driving is completely canceled only after it has been confirmed that a driver operates the vehicle properly when making a changeover from automated driving to manual driving.

However, in the described automated driving control device, automated driving may not be easily canceled even when the driver has erroneously made a request to start automated driving.

SUMMARY OF THE INVENTION

The invention provides a driving assist device that properly makes a changeover between automated driving and manual driving for traveling on the basis of a driving operation by a driver.

A driving assist device according to one aspect of the invention includes a first control portion that controls a vehicle to carry out automated driving, and a second control portion that controls the vehicle to make a shift to manual driving, in which the vehicle travels on a basis of an driving operation by a driver, when canceling the automated driving, and changes a manner of canceling the automated driving in accordance with an elapsed time from a start of the automated driving.

According to the one aspect of the invention, a manner of canceling automated driving is changed on the basis of an elapsed time from the start of automated driving. Therefore, a changeover from automated driving to manual driving can be properly made in accordance with an intention of the driver.

In the driving assist device according to the one aspect of the invention, the second control portion may set the manner of canceling the automated driving to a manner that is easier the automated driving before a predetermined time is elapsed from the start of the automated driving than the manner of canceling the automated driving after the predetermined time is elapsed. Further, in the driving assist device according to the one aspect of the invention, the second control portion may cancel the automated driving when a first cancellation requirement is fulfilled before a predetermined time is elapsed from the start of the automated driving, and may cancel the automated driving when a second cancellation requirement that is difficult to cancel the automated driving than the first cancellation requirement is fulfilled after the predetermined time is elapsed. In this case, the second cancellation requirement may be more severe in constraint on a cancellation operation of the automated driving by the driver, more complicated in the cancellation operation, or larger in number of times of the cancellation operation than the first cancellation requirement. In the aforementioned driving assist device, a changeover from automated driving to manual driving can be easily made by setting the manner of canceling automated driving so that the automated driving is relatively easy before the elapse of the predetermined time from the start of automated driving. Further, in the aforementioned driving assist device, the changeover from automated driving to manual driving can be safely made setting the manner of canceling automated driving so that the automated driving is relatively difficult after the elapse of the predetermined time from the start of automated driving.

Further, in the driving assist device according to the one aspect of the invention, the second control portion may set the manner of canceling the automated driving to a manner that is easier to cancel the automated driving in a case where a driving state of the vehicle at the start of the automated driving is deviant from a predetermined driving state than in a case where the driving state is consistent with the predetermined driving state. In the aforementioned driving assist device, a changeover from automated driving to manual driving can be properly made in accordance with an intention of the driver by setting the manner of canceling automated driving so that the automated driving is relatively easy in a case where a driving state of the vehicle at the start of the automated driving is deviant from a predetermined driving state.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a block diagram showing a configuration of a driving assist device according to each of the embodiments of the invention;

FIG. 2 is a flowchart showing an operation of the driving assist device according to the first embodiment of the invention; and FIG. 3 is a flowchart showing an operation of the driving assist device according to the second embodiment of the invention.

DETAILED DESCRIPTION OF EMBODIMENTS

A driving assist device 1 according to the first embodiment of the invention will be described hereinafter using FIGS. 1 and 2. In the description of the drawings, like elements are denoted by using like reference symbols, and the description of such elements is not repeated.

FIG. 1 is a block diagram showing a configuration of a driving assist device 1 according to the invention.

As shown in FIG. 1, the driving assist device 1 according to this embodiment of the invention is a device mounted on a vehicle to perform driving control of the vehicle. The driving assist device 1 controls the vehicle to carry out automated driving. This driving assist device 1 is configured to include a vehicle state detection portion 2, an environmental condition acquisition portion 3, an automated driving start input portion 4, an override detection portion 5, a vehicle control electronic control unit (ECU) 6, a driving mode output portion 7, and an automated driving output portion 8. It should be noted that the automated driving mentioned herein means both entirely-automated driving for controlling the vehicle to automatically travel to a input destination and semi-automated driving assisted by a lane keeping assist (LKA) system, an adaptive driving control (ACC) system or the like. The LKA system is a system for controlling the vehicle to keep traveling within a lane through a lane keeping assist function in order to alleviate a burden on the driver during driving within a lane. The ACC system is a system for controlling a vehicle speed to travel at a constant speed and for controlling throttle/brake on the basis of a distance to a preceding vehicle.

The vehicle state detection portion 2 functions as means for detecting pieces of information on a vehicle state, such as a piece of information on a position of the vehicle, a piece of information on a vehicle speed, and the like. For example, a global positioning system (GPS), wheel speed sensors, and the like are employed as the vehicle state detection portion 2. The GPS acquires the piece of information on the position of the vehicle. The wheel speed sensors are fitted to, for example, wheels of the vehicle to acquire wheel speeds of the vehicle respectively. The vehicle state detection portion 2 is connected to the vehicle control ECU 6 to output the acquired pieces of information on the vehicle state, such as the piece of information on the position, the piece of information on the wheel speeds, and the like, to the vehicle control ECU 6.

The environmental condition acquisition portion 3 functions as means for acquiring pieces of information on an environmental condition around the vehicle. For example, a vehicle-to-vehicle communication device, a road-to-vehicle communication device, a radar sensor that uses radio waves in millimeter wave band or laser beams, and the like are employed as the environmental condition acquisition portion 3. Pieces of information regarding the positions and speeds of other vehicles may be acquired through the vehicle-to-vehicle communication device and the road-to-vehicle communication device. Further, pieces of information regarding the positions and relative speeds of other vehicles and obstacles on a traveling path can be acquired by employing a millimeter-wave radar sensor or the like. The environmental condition acquisition portion 3 is connected to the vehicle control ECU 6 to output the acquired pieces of information on the environmental condition around the vehicle to the vehicle control ECU 6.

The automated driving start input portion 4 is a portion that accepts a start operation for automated driving of the vehicle by a driver. The automated driving start input portion 4 is constituted by, for example, a button switch or the like. When the button switch is depressed, the start of automated driving is input to the driving assistant device 1.

The override detection portion 5 detects override operations by the driver. Override operations, as used in this specification, refer to driving operations by the driver during automated driving, such as steering wheel operation, accelerator operation, brake operation, and the like. In detecting override by the driver, the override detection portion 5 may simply detect the presence or absence of override by the driver, or override that fulfills a predetermined condition (e.g., a predetermined motion, a predetermined override time).

The vehicle control ECU 6 performs overall control of the driving assist device 1, and is mainly constituted by, for example, a computer including a CPU (not shown), a ROM (not shown), and a RAM (not shown). The vehicle control ECU 6 is connected to the vehicle state detection portion 2, the environmental condition acquisition portion 3, the automated driving start input portion 4, the override detection portion 5, the driving mode output portion 7, and the automated driving output portion 8. Various pieces of information are input to the vehicle control ECU 6 from the vehicle state detection portion 2, the environmental condition acquisition portion 3, the automated driving start input portion 4, and the override detection portion 5. The vehicle control ECU 6 outputs the various pieces of information to the driving mode output portion 7 and the automated driving output portion 8.

Further, the vehicle control ECU 6 has a driving control portion 61 that changes a manner of canceling automated driving on the basis of an elapsed time from the start of automated driving. In the driving assist device 1 according to this embodiment of the invention, the driving control portion 61 sets the manner of canceling automated driving so that automated driving is easier before the elapse of a predetermined time (e.g., 5 to 300 seconds, preferably 10 to 60 seconds) from a time when the automated driving start input portion 4 accepts the start operation of automated driving by the driver. More specifically, the driving control portion 61 cancels automated driving when the override detection portion 15 detects an override before the elapse of the predetermined time, and does not cancel automated driving unless a prescribed procedure is carried out in addition to the detection of override by the override detection portion 5 after the elapse of the predetermined time. It should be noted that the prescribed procedure may include a procedure for checking, upon a changeover from automated driving to manual driving, whether or not a driving operation by the driver is proper in order to maintain a safe driving state after the changeover to manual driving. The prescribed procedure may be to perform a operation to fulfill a predetermined condition. In addition, the manner of canceling automated driving may be changed by changing a cancellation requirement to be fulfilled to cancel automated driving. That is, before a predetermined time is elapsed from the start of the automated driving, automated driving may be cancelled when a first cancellation requirement is fulfilled and, after the predetermined time is elapsed, automated driving may be cancelled when a second cancellation requirement that is difficult to cancel the automated driving than the first cancellation requirement is fulfilled. In case automated driving is cancelled in response to a cancellation operation by the driver, a constraint on the cancellation operation for the second cancellation requirement may be more severe than the first cancellation requirement than the first cancellation requirement, or the second cancellation requirement may be more complicated in the cancellation operation or larger in number of times of the cancellation operation than the first cancellation requirement, for example.

It should be noted that the driving control portion 61 provided in the vehicle control ECU 6 may be constituted through the introduction of a program into the computer or by individual pieces of hardware.

The driving mode output portion 7 functions as means for notifying the driver of a driving mode, namely, whether automated driving of the vehicle at the current time is easy or difficult. The driving mode mentioned herein may be different between automated driving and manual driving, or between different manners of canceling automated driving. The driving mode output portion 7 displays an indication of the driving mode of the vehicle on a display portion such as a meter or the like, or notifies the driver of the driving mode of the vehicle through sound, light, or the like. Thus, the driver can recognize the current state of the vehicle (the driving mode in which the vehicle travels).

As shown in FIG. 1, the automated driving output portion 8 is connected to the vehicle control ECU 6 to perform driving control of the vehicle, for example, automatic control of driving operation, braking operation, and steering operation on the basis of a control signal of the vehicle control ECU 6. The automated driving output portion 8 is, for example, a driving ECU that controls an actuator for adjusting an opening degree of a throttle valve of an engine, a braking ECU that controls a brake actuator for adjusting a brake fluid pressure, or a steering ECU that controls a steering actuator for applying a steering torque.

Next, the operation of the driving assist device 1 will be described using FIG. 2. FIG. 2 is a flowchart showing the flow of a processing performed by the driving assist device 1. Hereinafter, the driving control portion 61 controls the automated driving output portion 8 to automatically travel to a destination input in advance in response to the depression of the button switch constituting the automated driving start input portion 4 by a user.

At the beginning, the vehicle to be controlled is in a state of manual driving (hereinafter referred to as "a manual driving mode") in which the vehicle is controlled in accordance with a driving operation by the driver. At this time, the driving control portion 61 monitors whether or not the button switch constituting the automated driving start input portion 4 has been depressed by the driver (whether or not the start of automated driving has been input) (S01). In this case, upon detecting depression of the button switch by the driver (S01: YES), the driving control portion 61 controls the automated driving output portion 8 to start automated driving of the vehicle to the destination input in advance, and makes a shift to a mode (hereinafter referred to as "a transition mode") in which automated driving is immediately canceled when the override detection portion 5 detects override (S02). On the other hand, when failing to detect depression of the button switch by the driver (S01: NO), the driving control portion 61 stands by until the button switch is depressed by the driver.

Then, when the vehicle is automatically traveling toward the destination in the transition mode in step S02, the driving control portion 61 monitors the presence or absence of override of the driver (S03). At this time, the driving mode output portion 7 blinks a lamp of the button switch for a changeover to an automated driving in order to notify the driver that the vehicle is in the transition mode. Thus, the driver can recognize that the vehicle is in the transition mode, namely, that the vehicle is not in a complete automated driving state realized by the vehicle control ECU 6 but in a state controllable by the driver.

The override detection portion 5 detects override of the driver, and delivers a detection signal to the driving control portion 61 (S03: YES). At this time, the driving control portion 61 makes a changeover from the automated driving mode to the manual driving mode without another condition (S04).

On the other hand, when the override detection portion 5 does not detect override of the driver (S03: NO), the driving control portion 61 measures a time from the start of the transition mode in step S02, and monitors whether or not a predetermined time (e.g., 5 to 300 seconds, preferably 10 to 60 seconds) has elapsed (S05). When it cannot be determined that the predetermined time has elapsed from the start of the transition mode (S05: NO), the driving control portion 61 maintains the transition mode. On the other hand, when it is determined that the predetermined time has elapsed from the start of the transition mode (S05: YES), the driving control portion 61 makes a shift to a mode (hereinafter referred to as "the automated driving mode") in which automated driving is not immediately canceled even when the override detection portion 5 detects override (S06). That is, in the automated driving mode in step S06, a changeover to the manual driving mode is made only after a prescribed procedure, for confirming whether or not the driving operation by the driver is proper, namely, whether or not a safe driving state is ensured after a changeover to manual driving, is carried out.

Further, in the automated driving mode in step S06, the driving mode output portion 7 lights, for example, a lamp of the button switch for making a changeover to the automated driving mode in order to notify the driver that the vehicle is in the automated driving mode. Thus, the driver can recognize that the vehicle is in the automated driving mode, namely, that the vehicle is in a complete automated driving state realized by the vehicle control ECU 6.

As described above, the driving assist device 1 according to this embodiment of the invention is designed to change the manner of canceling automated driving on the basis of the elapsed time from the start of automated driving. Before the lapse of the predetermined time, when override is detected, the driving control portion 61 makes a shift from automated driving (the transition mode) to manual driving without another condition. However, after the elapse of the predetermined time, the driving control portion 61 refrains from making a shift from automated driving (the automated driving mode) to manual driving unless the prescribed procedure is carried out in addition to the detection of the override. When the elapsed time from the start of automated driving is relatively short, the driver may often be ready for manual driving. In this case, it is possible to change the manner of canceling automated driving so that automated driving is easy. On the other hand, when the elapsed time from the start of automated driving is relatively long, the driver may often be not sufficiently ready for manual driving. It is therefore preferable to change the manner of canceling automated driving so that automated driving is difficult. In view of this actual situation, the driving assist device 1 according to this embodiment of the invention can properly make a changeover between automated driving and manual driving.

Further, immediately after the start of automated driving, it may be desired to cancel automated driving because automated driving has been erroneously started, the input destination turns out to be wrong, or policy in traveling of automated driving is not consistent with that of the driver. The driving assist device 1 according to this embodiment of the invention can easily make a changeover to manual driving in such cases described above. Further, the driving assist device 1 according to this embodiment of the invention restrains a changeover to manual driving from being made when the driver is not sufficiently ready for manual driving, thereby making it possible to ensure safety during manual driving. As a result, the driving assist device 1 can realize the type of control that is accompanied by both convenience and safety.

Although the first embodiment of the invention has been described above, the invention is not limited to the foregoing embodiment thereof but can be subjected to various modifications without departing from the gist of the invention.

For example, the invention may be configured as in the second embodiment thereof that will be described below. In the second embodiment of the invention, the driving assist device 1 performs a processing shown in a flowchart of FIG. 3. That is, the driving control portion 61 change the manner of canceling automated driving depending on whether or not a driving state at the start of automated driving (that is, a driving state of manual driving upon the start of automated driving) conforms to traffic regulations.

Processing steps (S11, S12) of the flowchart shown in FIG. 3 that are different from those described in FIG. 2 will be described hereinafter.

In step S11, the driving control portion 61 monitors whether or not driving by the driver during manual driving conforms to the traffic regulations (S11). It should be noted that the traffic regulations mentioned herein is one example of a predetermined reference driving state of automated driving. The traffic regulation is, for example, such that the vehicle travels on the left lane in Japan (the vehicle do not travels on the opposite lane) in the case of a road with two lanes.

In step S12, it is determined whether or not a requirement for making a changeover from the transition mode, in which automated driving is immediately canceled when the override detection portion 5 detects override, to the automated driving mode, in which automated driving is not immediately canceled even when the override detection portion 5 detects override, is fulfilled (S12). More specifically, the driving control portion 61 makes a shift to the automated driving mode on the requirement that the driving state of the vehicle conform to the traffic regulations when the automated driving start input portion 4 accepts the operation of a start of automated driving. In other words, when the traffic regulations are not conformed to at the start of automated driving, the driving control portion 61 maintains the transition mode in which a changeover to the manual driving mode can be easily made. That is, in a case where a driving state of the vehicle at the start of the automated driving is deviant from a predetermined driving state, the manner of canceling the automated driving that is easier to cancel the automated driving than in a case where the driving state is consistent with the predetermined driving state is set.

Thus, when automated driving is, for example, erroneously started in overtaking a preceding vehicle on a road with two opposite lanes, automated driving can be easily canceled. That is, when the driver deviates from the reference driving state of automated driving on purpose, automated driving designed to return to the reference driving state of automated driving can be easily canceled. As a result, the driving assist device 1 can realize the type of control that is accompanied by both convenience and safety.

The requirement for making a changeover to the automated driving mode may not only be conformity to the traffic regulations, but may also be a traffic manner, a predetermined traveling speed, a predetermined inter-vehicular distance, or the like. One example of the traffic manner is such that, in case of a road with a driving lane and an overtaking lane (a road with two lanes each way), the vehicle travels on the driving lane except when overtaking.

Further, in the driving assist device 1 according to the foregoing embodiments of the invention, the description has been given citing an example in which the invention is applied to a system for automated driving to travel to the destination input in advance. However, the invention is not limited to this example. The invention may be applied to the aforementioned LKA system, the aforementioned adaptive driving control (ACC) system, or the like.

Further, in the driving assist device 1 according to the foregoing embodiment of the invention, the description has been given citing the elapsed time from the start of automated driving (the start of the transition mode) and conformity to the traffic regulations as examples of the requirement for making a changeover from the transition mode to the automated driving mode. However, the invention is not limited to these examples. A determination on the changeover may be made on the basis of combination of the elapsed time from the start of automated driving and conformity to the traffic regulations. Further, the aforementioned traffic manner, the aforementioned inter-vehicular distance, or the like may be adopted as a requirement.

Further, in the driving assist device 1 according to the foregoing embodiment of the invention, the description has been given citing an example in which the driving control portion 61 makes a changeover in step S04 from the transition mode (automated driving) to the manual driving mode (manual driving) when the override detection portion 5 detects override in step S03 as shown in FIGS. 2 and 3, without another condition. For example, when the time of override detected by the override detection portion 5 is shorter than a given time (e.g., 0 to 3 seconds), the driving control portion 61 may maintain the transition mode instead of making a changeover from the transition mode to the manual driving mode. In this manner, it is possible to make the changeover more properly by determining from a duration time of override whether or not this override is intended to cancel automated driving.

The invention claimed is:

1. A driving assist device comprising:
 circuitry configured to:
  control a vehicle to carry out automated driving;
  control the vehicle to make a changeover between a manual driving mode, in which the vehicle travels on a basis of a driving operation by a driver, and an automated driving mode, in which the vehicle carries out the automated driving; and
  control the vehicle to make a shift from the manual driving mode to a transition mode, in which canceling the automated driving has fewer requirements than canceling the automated driving mode, when the automated driving is started and to make a shift from the transition mode to the automated driving mode after the vehicle makes the shift from the manual driving mode to the transition mode,
 wherein, in the transition mode, the vehicle is not completely controlled by the automated driving and may be controlled by the driver.

2. The driving assist device according to claim 1, further comprising an override detection portion that detects an override operation by the driver during the automated driving, wherein:
 in the transition mode, the automated driving is canceled when the override operation is detected; and
 in the automated driving mode, the automated driving is canceled after a predetermined cancellation procedure is performed when the override operation is detected.

3. The driving assist device according to claim 2, wherein the predetermined cancellation procedure is a procedure for confirming whether or not a safe driving state is ensured after a changeover to manual driving.

4. The driving assist device according to claim 1, wherein the circuitry is further configured to control the vehicle to make the shift from the transition mode to the automated driving mode after a predetermined time is elapsed from when the automated driving is started.

5. The driving assist device according to claim 1, wherein the circuitry is further configured to control the vehicle to make the shift from the transition mode to the automated driving mode when a driving state of the vehicle is consistent with a predetermined reference driving state of the automated driving.

6. The driving assist device according to claim 5, wherein the predetermined reference driving state of the automated driving is based on traffic regulations, a traffic manner, a predetermining traveling speed, or a predetermined inter-vehicular distance.

\* \* \* \* \*